United States Patent [19]

Rathgeb

[11] Patent Number: 4,839,991
[45] Date of Patent: Jun. 20, 1989

[54] RETRACTABLE GUARD FOR MOTOR VEHICLE DOOR

[76] Inventor: Peter M. Rathgeb, 5721 SW. 162nd Ave., Fort Lauderdale, Fla. 33331

[21] Appl. No.: 190,140

[22] Filed: May 4, 1988

[51] Int. Cl.⁴ .............................................. B60J 5/00
[52] U.S. Cl. ...................................................... 49/462
[58] Field of Search ................................... 49/462, 460

[56] References Cited

U.S. PATENT DOCUMENTS

| | | | |
|---|---|---|---|
| 2,216,367 | 10/1940 | Hoblick | 292/1 |
| 2,678,232 | 5/1954 | Barry | 296/44 |
| 3,243,222 | 3/1966 | Loughary et al. | 296/44 |
| 3,280,510 | 10/1966 | Vaux | 49/401 |
| 3,473,264 | 10/1969 | Holka | 49/462 |
| 3,576,338 | 4/1971 | Horton | 292/213 |
| 3,879,895 | 4/1975 | Hinderks | 49/462 |

*Primary Examiner*—Philip C. Kannan
*Attorney, Agent, or Firm*—Joseph Scafetta, Jr.

[57] ABSTRACT

A retractable guard mechanism is provided for a vehicle door having a front hinge and a rear edge. The mechanism includes a bumper guard and a first group of elements, secured near to the rear edge of the door, for pivoting the bumper guard to an extended position beyond the rear edge of the door. A second group of elements is secured to the first group of pivoting elements in order to pivot the bumper guard upon impact around the first group. A cable is secured between the front hinge and the rear edge of the door and retracts the bumper guard from its extended position beyond the rear edge of the door. A spring arrangement is secured to the second group of pivoting elements and retracts the bumper guard from rotating around the second group of pivoting elements after the impact is alleviated.

16 Claims, 5 Drawing Sheets

RETRACTABLE GUARD FOR MOTOR VEHICLE DOOR

BACKGROUND OF THE INVENTION

1. Field of the Invention

The present invention relates to movable closures generally and to protectors, in particular.

2. Description of the Related Art

Door guards and bumpers are primarily designed to prevent damage to an unattended automobile to which an adjacent motor vehicle has parked too close. When either the driver or a passenger opens a door of the adjacent motor vehicle to get out, the narrow edge on the opening door makes contact with the body of the unattended automobile, thus causing a dent or a scratch or both.

The cause of damage on the innocent automobile is difficult to prove and costly to repair. Such damages can be frustrating to the owner.

Door stripping currently on automobiles is insufficiently protective because differently sized motor vehicles, such as vans and trucks, make contact either above or below such door stripping. With the average high price of motor vehicles today, many purchasing consumers would welcome a reasonable and effective solution to this frustrating problem.

Although there have been several solutions offered to this problem in the past, none of them has been found either effective or sufficiently acceptable for use on all motor vehicles generally.

For example, U.S. Pat. No. 2,216,367 issued to Hoblick in 1940 and relates to a protective cover for use in connection with members, such as a latch, projecting from the edge of an automobile door, but is now obsolete because the design of car doors has changed dramatically since 1940.

U.S. Pat. No. 2,678,232 issued to Barry in 1954 and relates to a retractable door guard that protects a large area of the automobile but it takes up too much room inside the door to be considered practical for modern motor vehicles.

U.S. Pat. No. 3,243,222 issued to Loughary et al in 1966 and relates to a retracting door bumper that is fairly efficient in design but covers too small an area to be effective. Also, it is cosmetically ugly.

U.S. Pat. No. 3,280,510 issued to Vaux in 1966 and relates to a retractable door bumper that is too complex. Also, it covers only a small area and the bumper can be seen from outside the automobile when the door is closed.

U.S. Pat. No. 3,473,264 issued to Holka in 1969 and was assigned to the Ford Motor Co. It relates to a door edge guard that is one of the better concepts but is also too small to be effective and may still allow damage to be caused at a point of contact above or below the guard.

U.S. Pat. No. 3,576,338 issued to Horton in 1971 and also was assigned to the Ford Motor Co. It relates to a door edge guard that, under the right circumstances, may be protective but is too small to be effective generally and would still tend to make a dent in any other car that would be contacted.

Finally, U.S. Pat. No. 3,879,895 issued to Hinderks in 1975 and relates to a closure member and protector that itself would appear to be effective by covering a large area but, as with some of the other prior art devices discussed above, it is too complex to be practical. Furthermore, the protector is not effective until the offending door is completely open and then it protects only its own door edge and not any part of the other innocently parked automobile.

Thus, it remains a problem in the prior art to provide a retractable guard that effectively protects the edge of a motor vehicle door from damage and also protects parts of an adjacent parked motor vehicle from damage caused by the opening door of the offending motor vehicle.

SUMMARY OF THE INVENTION

A retractable guard effectively protects the edge of a motor vehicle door from damage and also protects parts of an adjacent motor vehicle from damage caused by the opening door of the offending motor vehicle. The guard is retracted when the door is shut, but extends outwardly when the door is being opened.

The primary object of the invention is to protect an unattended motor vehicle from damage caused by a careless or accidental impact from a door being opened by a driver or passenger of an adjacent parked vehicle.

A secondary object of the invention is to provide a resilient energy-absorbing bumper guard that will prevent dents from occurring under the guard of the offending door being opened.

Another object of the invention is to protect a very large area along the edge of the offending door as well as along the body of the innocently parked adjacent motor vehicle.

A further object of the invention is to provide a bumper guard that retracts completely out of view when the offending door is shut so that no cosmetically ugly features are visible and so that no air resistance is generated while the vehicle is being driven. Thus, aerodynamic drag is reduced and gas mileage is enhanced.

These objects and certain advantages of the invention will become evident from the following brief description of the drawings when reviewed in conjunction with the subsequent detailed description of the preferred embodiments.

DETAILED DESCRIPTION OF THE PREFERRED EMBODIMENTS

Figure 1:
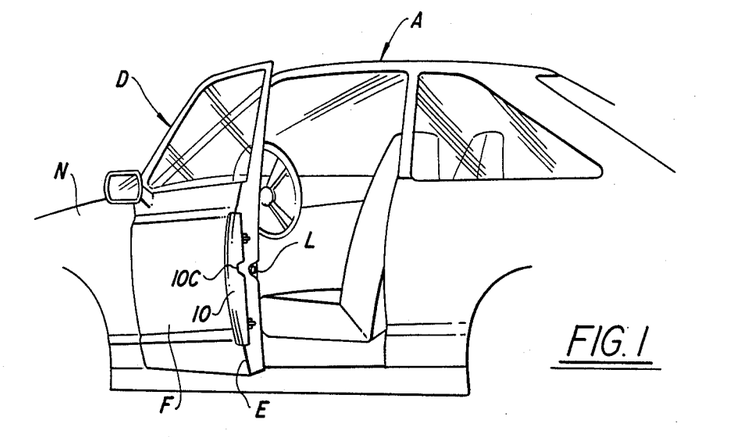
FIG. 1 shows a perspective view of an automobile equipped with the bumper guard of the invention on an opening door.

In FIG. 1, there is shown an automobile A having a side fender N and open front door D with an outer face F having an edge E from behind which a retractable bumper guard 10 pivots outwardly. A cutout portion 10C allows the bumper guard 10 to fit neatly around a latch L on the side of the door D.

Figure 2A:
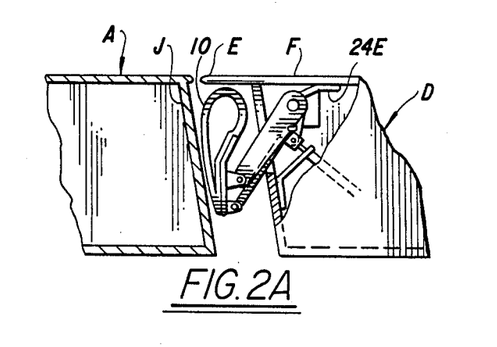
FIG. 2A shows a cross-sectional top plan view of the bumper guard of a first embodiment in its fully retracted position.

FIG. 2A shows a top plan view of the bumper guard 10 in its retracted position behind the edge E on the outer face F of the door D and against an aft door jamb J of the automobile A.

Figure 2B:
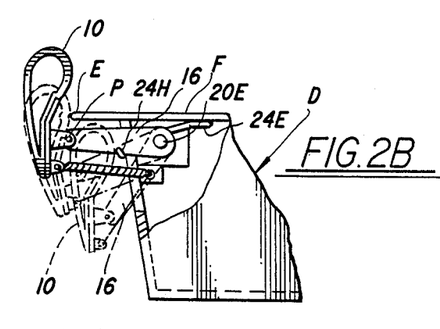
FIG. 2B shows a cross-sectional top plan view of the bumper guard of the first embodiment extending outwardly as a door of the automobile is being opened.

FIG. 2B shows the bumper guard 10 in phantom lines moving from its retracted position behind the outer face F of the door D to its fully extended position beyond the edge E of the door D. It should be noted that the bumper guard 10 in this first embodiment always moves perpendicularly to the outer face F of the door D because of the primary pivotal movement about a first pivot point end 20E and also because of the secondary pivotal movement about a second pivot point pin P, both of which will be described in detail later. It should also be noted that the bumper guard 10 is already in a position, shown in phantom lines, to protect the edge E of the door D even before the bumper guard 10 is pivoted completely outward to the position shown in solid lines.

Figure 2C:
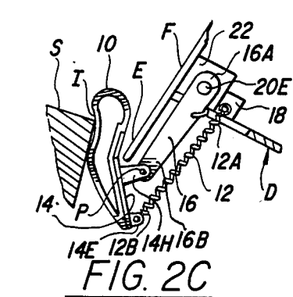
FIG. 2C shows a cross-sectional top plan view of the bumper guard of the first embodiment as it contacts a hard object adjacent to the parked automobile having its door opened.

FIG. 2C shows the bumper guard 10 when it has been fully extended beyond the edge E of the front face F of the door D. The bumper guard 10 is in contact with a hard object, such as a wall or a side S of another motor vehicle. Due to the elastic nature of the material which comprises the bumper guard 10, an impact indentation I occurs only on the bumper guard 10 so that no dent is made in the side S of the innocently parked adjacent motor vehicle. A tension spring 12 is held at one end 12A to a first bracket 18 on the door D and is attached at the other end 12B to an eyelet 14E on a plate 14 that backs the bumper guard 10. This tension spring 12 is shown in its extended and stressed condition. A lever 16 is also secured at one rounded end 16A to the end 20E of a rod 20 (not shown) which is held in place by a second bracket 22 on the door D so that the lever 16 moves in a circular path, with the end 20E as the center of the path, when the rod 20 is rotated about its longitudinal axis. The lever 16 is also attached at an opposite rounded end 16B to a hinge 14H behind the plate 14. The plate 14 carrying the bumper guard 10 pivots primarily around the first pivot point end 20E and secondarily around the second pivot point P which acts through the hinge 14H and the rounded end 16B of the lever 16.

Figures 3, 5A, 5B:
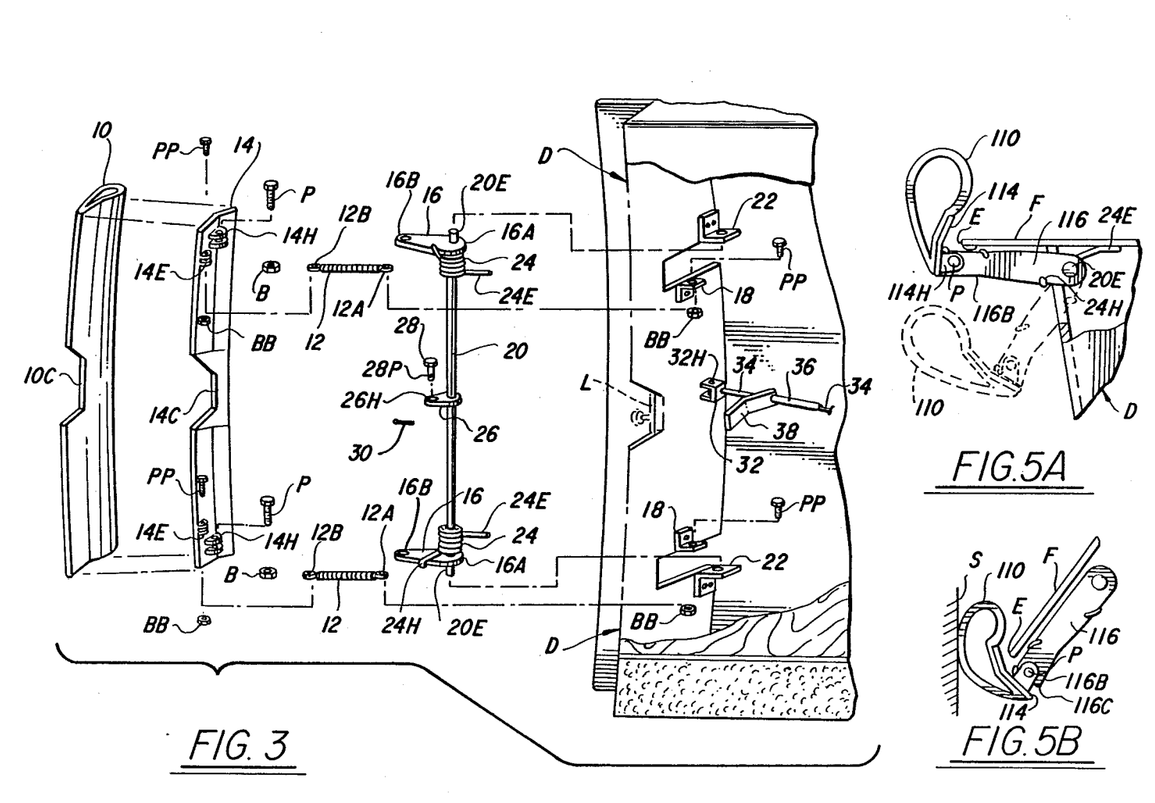
FIG. 3 shows an exploded perspective view of the first embodiment of the invention.
FIG. 5A shows a cross-sectional top plan view of the bumper guard of a second embodiment extending outwardly as a door of an automobile equipped with the invention is being opened.
FIG. 5B shows a cross-sectional top plan view of the bumper guard of the second embodiment as it contacts the body of an unattended motor vehicle adjacent to the parked automobile having its door opened.

FIG. 3 is an exploded view of the retractable door guard of the first embodiment of the present invention. The bumper guard 10 with its cutout portion 10C is attached to the front side of the backing plate 14 along its entire length. Note that the plate 14 has a cutout portion 14C which corresponds to the cutout portion 10C to fit neatly around the latch L on the door D. Hinges 14H and eyelets 14E are shown as elements integrally formed, either by welding or casting, with the rear side of the backing plate 14. The direction of insertion of secondary pivot pins P is shown by dashed lines passing through openings in the hinges 14H. The pins P are fastened in the hinges 14H and through the rounded ends 16B of the levers 16 by nuts B. Likewise, the direction of insertion of smaller pivot pins PP is shown by dashed lines passing through openings in the eyelets 14E. These smaller pins PP are fastened in the eyelets 14E and through looped ends 12B of the tension springs 12 by smaller nuts BB. Similarly, looped ends 12A of the tension springs 12 are held in place to the door D by identical smaller pins PP that pass through openings in the first L-shaped brackets 18 and that are fastened to these first brackets 18 by identical smaller nuts BB. Ends 16A of the levers 16 have the primary pivot point ends 20E of a rod 20 pass through openings therein. The rod 20 is secured to the door D by larger second L-shaped brackets 22 which have holes for retaining the primary pivot point ends 20E of the rod 20 therein. A pair of torsion springs 24 hold the levers 16 at their sides opposite from the brackets 22 to the rod 20 by way of a hook 24H which is at one end of each torsion spring 24. Opposite ends 24E of each torsion spring 24 have a different function which will be described later. At the midsection of the rod 20, there is an arm 26 having an enlarged end with a first hole through which the rod 20 passes. At the opposite end of the arm 26, there is a second hole 26H through which a bolt 28 passes. The bolt 28 has a passage 28P through its distal end for a cotter pin 30 so that the bolt 28 is secured in the hole 26H of the arm 26. The bolt 28 also passes through holes 32H in a C-shaped clamp 32 so that the clamp 32 is secured to the arm 26. This clamp 32 is attached at one end of a cable 34 having a housing 36 that is held to the door D by a third L-shaped bracket 38.

Figures 4, 5C, 6:
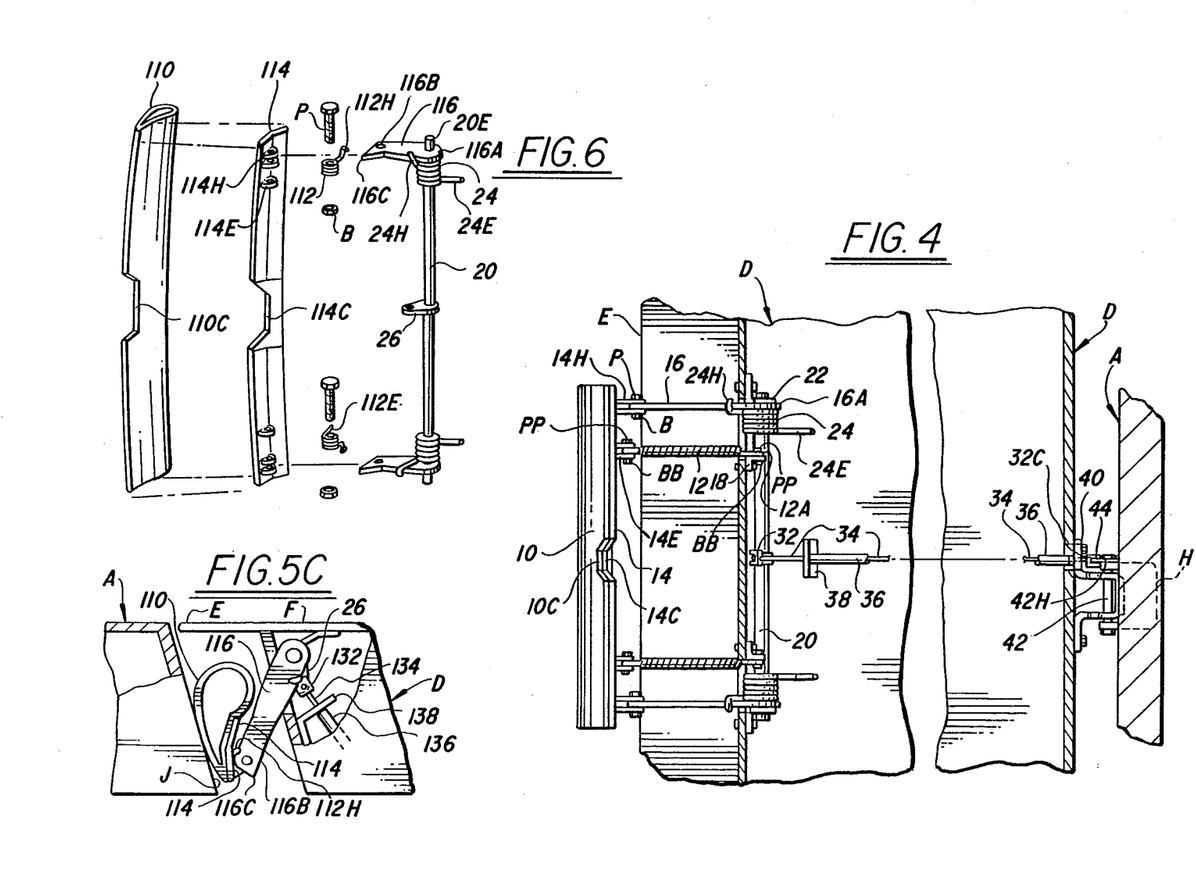
FIG. 4 is a partially broken away side elevational view of the first embodiment of the invention.
FIG. 5C shows a cross-sectional top plan view of the bumper guard of the second embodiment in its fully retracted position.
FIG. 6 shows an exploded perspective view of the bumper guard of the second embodiment of the invention.
Figure 8:
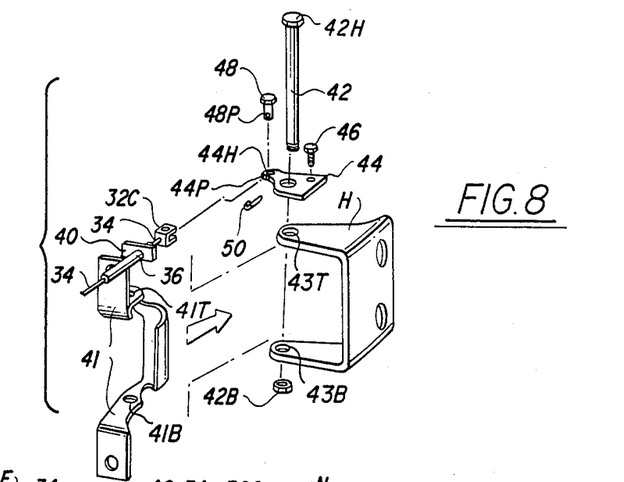
FIG. 8 is an exploded perspective view of the cable mount and hinge arrangement for the first and the second embodiment of the invention.

FIG. 4 is a side elevational view of the retractable door guard of the first embodiment. The left side of FIG. 4 shows the exploded elements of FIG. 3 assembled together. A discussion of these elements need not be repeated here. The right side of FIG. 4 shows the assembled elements that are exploded in FIG. 8. A detailed description of these elements is deferred until FIG. 8 is discussed. It is sufficient to say at this point that the actuation of the present invention to pivot the bumper guard 10 outwardly beyond the edge E of the door D begins when the door D is opened to swing outwardly away from the body of the automobile A. This initial actuation begins with a hinge H when the door D is opened.

FIG. 5A shows a top plan view of a second embodiment of the present invention in which a bumper guard 110 moves from its retracted position shown in phantom lines to its fully extended position shown in solid lines beyond the edge E on the outer face F of the door D. In this regard, FIG. 5A showing the second embodiment is analogous to FIG. 2B showing the first embodiment. The end 24E of the torsion spring 24 (not shown) beneath a lever 116 abuts against the inner side of the face F. A torque is imparted to the lever 116, via the hook 24H, in order to pivot outwardly the outer end 116B when lever 116 moves with the rod 20 (not shown), as the rod 20 is rotated about its longitudinal axis. Similar to the first embodiment shown in FIGS. 2C and 3, it may be seen that, in the second embodiment shown in FIG. 5A, the hinge 114H is fastened to a backing plate 114 that carries the bumper guard 110. The backing plate 114 is not as wide as the backing plate 14 shown in FIG. 3, relating to the first embodiment. Consequently, the elastic bumper guard 110 in the second embodiment shown in FIG. 5A is more bulbous than the bumper guard 10 in the first embodiment shown in FIG. 3. It can also be clearly seen in FIG. 5A that the bumper guard 110 of the second embodiment moves in an arcuate path and does not maintain a position always perpendicular to the front face F of the door D, as does the bumper guard 10 of the first embodiment shown in FIG. 2B. Nevertheless, the bumper guard 110 of the second embodiment shown in FIG. 5A pivots primarily around the end 20E of the rod 20 (not shown) and has its secondary pivotal movement around the pin P through the hinge 114H and the end 116B of the lever 116.

By referring now to FIG. 5B, which shows the bumper guard 110 fully extended beyond the edge E of the front face F of the door D and in contact with a hard object such as a side S of another motor vehicle, it may be seen that the secondary pivotal movement is limited around the pin P because the end 116B of the lever 116 is straight and parallel to the backing plate 114, in contrast to the first embodiment which, as shown analogously in FIG. 2C, has its end 16B of the lever 16 rounded, to allow total secondary pivotal movement about the pin P.

FIG. 5C shows the bumper guard 110 of the second embodiment in its fully retracted position, analogous to the position of the first embodiment shown in FIG. 2A, stowed behind the edge E on the outer face F of the door D and against the aft door jamb J of the automobile A.

FIG. 6 shows an exploded view of the part of the second embodiment, which is analogous to the part of the first embodiment shown on the left side of FIG. 3. Since identical or a similar 100-series of reference numerals relate to identical elements already discussed during the description of FIG. 3, only the elements of the second embodiment that differ from the elements of the first embodiment will be described in detail.

By comparing FIGS. 5A, 5B, and 5C of the second embodiment, with FIGS. 2A, 2B, and 2C of the first embodiment, it should have already been noted that the tension springs 12 of the first embodiment have been eliminated, and, as shown in FIG. 6, have been replaced by coil springs 112. Each coil spring 112 is placed under the hinge 114H and above the eyelet 114E, so that the pivot pin P can pass through the openings therein and retain the coil spring 112 against the rear face of the plate 114. A hooked end 112H of each coil spring 112 wraps partially around the straight end 116B of the lever 116, as best shown in FIG. 5C, while the opposite straight end 112E, as envisioned in FIG. 6, braces itself against the rear face of the plate 114. Because of its position against the backing plate 114, with its hooked end 112H partially around the end 116B of the lever 116, the coil spring 112 tends to rotate the backing plate 114 and the bumper guard 110 carried thereon counterclockwise around the rod 20, but is limited in its movement of the plate 114 and the bumper guard 110 by a corner 116C which juts outwardly from the end 116B of the lever 116 to prevent further rotation caused by the coil spring 112, once the backing plate 114 contacts the corner 116C. The torque exerted by the coil spring 112, to rotate the backing plate 114 and the bumper guard 110 counterclockwise, is overcome only by the force exerted by the aft door jamb J in FIG. 5C, while the bumper guard 110 is in its fully retracted and stowed position, and also by the force exerted by the side S of another motor vehicle in FIG. 5B, while the bumper guard 110 is in contact therewith. In both FIGS. 5B and 5C, it can be seen that the bumper guard 110 is being impacted in the clockwise direction and that the backing plate 114 has been moved out of contact with the corner 116C on the end 116B of the lever 116. In contrast thereto, in FIG. 5A, it can be seen that the bumper guard 110 is being rotated without impact in the clockwise direction, but that the backing plate 114 remains in contact with the corner 116C on the end 116B of the lever 116.

Figure 7A:
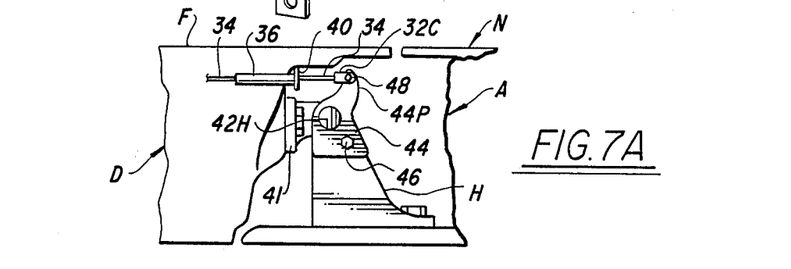
FIG. 7A shows a cross-sectional top plan view of a cable mounted to the top of a hinge for a closed front side door equipped with either the first or the second embodiment of the invention.

Referring now to FIG. 7A, the front door D of the automobile A with its outer face F is shown to be closed so that the bumper guard 10 or 110 (not shown) is in its fully retracted position. For the sake of simplicity, only reference numerals used to describe the first embodiment in FIGS. 3 and 4 will be repeated here, although it is to be understood that the 100-series of reference numerals can also be used to describe the second embodiment in FIG. 5C.

Figure 7B:
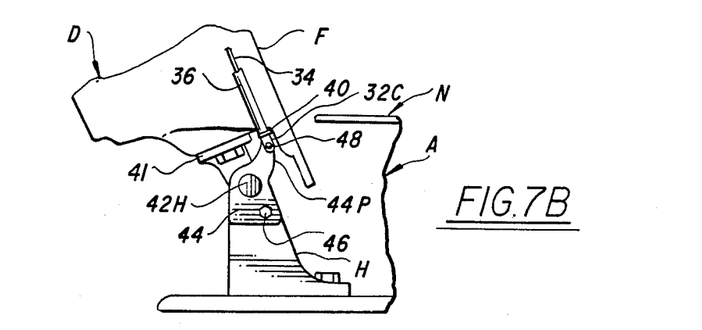
FIG. 7B shows a cross-sectional top plan view of a cable mounted to the top of a hinge for an opened front side door equipped with either the first or the second embodiment of the invention.

In FIGS. 7A and 7B, the automobile A is shown to have a hinge H forward of the door D and inside the front face F of the door D near the side fender N.

As best shown in FIG. 8, a bracket 40 is secured inside the front face F of the door D near to the hinge H. A plate 44 is secured upon the hinge H by a large pin 42 with a head 42H and a nut 42B. The large pin 42 passes successively through the plate 44, a top hole 43T in the hinge H, a top hole 41T in a hinge brace 41, a bottom hole 41B in the hinge brace 41, and finally through a bottom hole 43B in the hinge H. The nut 42B is then threaded onto the bottom of the large pin 42 for securing the pin 42 through the plate 44, the hinge H, and the brace 41. The plate 44 is prevented from moving relative to the hinge H by a screw 46. The plate 44 has a projecting portion 44P with a hole 44H therethrough. A C-shaped clamp 32C is fastened to the plate 44 by a smaller pin 48. The distal end of the pin 48 has a passage 48P through which a cotter pin 50 passes so that the C-shaped clamp 32C is securely held to the plate 44.

Referring now to FIG. 7B, the front door D is shown to be opened so that the bumper guard 10 or 110 (not shown) is in its fully extended position. As the door D is moved from its fully closed position in FIG. 7A to its fully opened position in FIG. 7B, it may be seen that the movement of the front door D carries the bracket 40 along the cable 34 towards the C-shaped clamp 32C which is fastened to the projecting portion 44P of the plate 44 on the door hinge H. Because the cable housing 36 is secured to and carried by the bracket 40, the cable housing 36 is also carried forward towards the C-shaped clamp 32C, thus allowing the cable 34 housed therein to slide inside to the left away from the front fender N of the automobile A.

A description of the differences between the two embodiments shown in FIGS. 7A, 7B, and 8 for the front door D and the third embodiment shown in FIGS. 9A, 9B, and 10 for the rear door R will now be made with the 200-series of reference numerals.

Figure 9A:
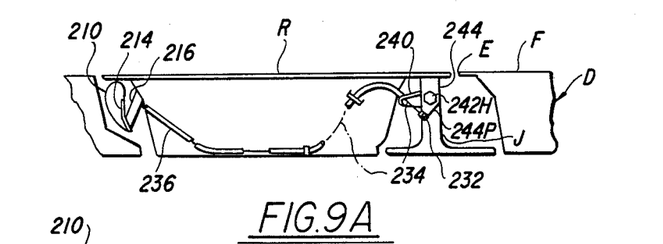
FIG. 9A shows a cross-sectional top plan view of the bumper guard of a third embodiment in its fully retracted position on a rear side door of an automobile.
Figure 9B:
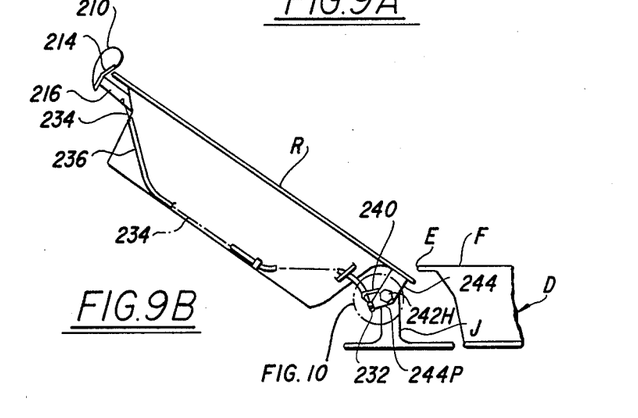
FIG. 9B shows a cross-sectional top plan view of the bumper guard of the third embodiment extending outwardly as the rear side door of the automobile equipped with the invention is being opened.
Figure 10:
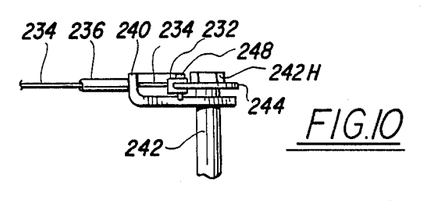
FIG. 10 shows a side elevational view of the third embodiment with enlarged details of a cable mounted to the top of a hinge for the rear side door.

FIG. 9A shows a top plan view of a bumper guard 210 in a third embodiment of the present invention in its fully retracted position while FIG. 9B shows the bumper guard 210 of the third embodiment in its fully extended position. It should be noted that this third embodiment has been engineered for use with a rear door R and not with the front door D of the automobile A.

The left side of the third embodiment shown in FIGS. 9A and 9B may be selected to be identical to either the first embodiment shown in FIGS. 2-4 or the second embodiment shown in FIGS. 5 and 6. The only difference between the third embodiment and the first or second embodiments reside in the right side of FIGS. 9A and 9B. These differences are highlighted in FIG. 10.

As shown in FIGS. 9A and 9B, the rear door R pivots about the aft door jamb J via a hinge plate 244 that is secured to the jamb J by a large pin 242 (FIG. 10) having a head 242H. The hinge plate 244 has a projecting portion 244P to which a C-shaped clamp 232, best shown in FIG. 10, is fastened by a pin 248. Likewise, the aft door jamb J has a projecting bracket 240 which is secured around the large pin 242 and holds a housing 236 containing a cable 234.

As the rear door R is moved from its closed position shown in FIG. 9A wherein the bumper guard 210 is fully retracted to its opened position shown in FIG. 9B wherein the bumper guard 210 is fully extended, the hinge plate 244 rotates the C-shaped clamp 232 in a clockwise direction around the large pin head 242H so that the cable 234 is pushed rearwardly into the housing 236 held by the bracket 240. At the left side of FIG. 9B, it may be seen that the cable 234 is pushed towards the lever 216. For accomplishing these movements, the cable 234 is preferably made of a slightly flexible metal.

The operation of the present invention will now be continued in regard to the first and second embodiments with reference to FIGS. 3 and 6, respectively.

Referring first to the right side of the exploded view shown in FIG. 3, it may be seen that, as the cable 34 is pushed rearwardly to the left by the opening movement of the front door D, the C-shaped clamp 32 on the end of the cable 34 is also moved rearwardly to the left while the third L-shaped bracket 38 holds the housing 36 in place. This rearward and leftward movement of the cable 34 and the C-shaped clamp 32 releases the tension in the cable 34 that has been pulling on the arm 26, the rod 20, and the torsion springs 24 so that these three elements are now all allowed to rotate clockwise to the left. Because this pulling tension of the cable 34 is released, the torsion springs 24 that are secured at opposite ends to the rod 20 are now allowed to rotate clockwise in the direction which they want to go. Referring now to FIG. 2B, the opposite end 24E of each torsion spring 24 is braced against the inner side of the face F so that the hooks 24H on the torsion springs 24 force the levers 16 to rotate also in the clockwise direction. This clockwise movement is shown in FIG. 2B by the lever 16 rotating in phantom lines from a seven o'clock position to a nine o'clock position shown in solid lines. As the hook 24H forces the lever 16 to rotate clockwise, the bumper guard 10 also pivots around the primary point end 20E so that the bumper guard 10 now extends beyond the edge E on the front face F of the door D. As shown in FIG. 2C, if the bumper guard 10 should impact upon the side S of an innocently parked adjacent motor vehicle, the bumper guard 10 and its backing plate 14 will rotate further in the clockwise direction about the secondary pivot pin P. Simultaneously, the tension spring 12 will be extended. When the door D is moved out of contact with the side S of the adjacent vehicle, the tension spring 12 will pull back the bumper guard 10 and its backing plate 14 in the counterclockwise direction so that the bumper guard 10 will return to its normal unimpacted position perpendicular to the front face F of the door D, as shown in FIG. 2B in solid lines.

When the door D is moved from its fully opened position shown in solid lines in FIG. 2B, to its fully closed position shown in FIG. 2A, the bumper guard 10 will be retracted to its stowed position between the door D and the jamb J.

This retracting action will be described with reference to FIGS. 5C and 6 which show the second embodiment of the present invention. As the door D shown in FIG. 5C is closed, the cable 134 in the housing 136 pulls on the C-shaped clamp 132 which in turn pulls the arm 26 shown in FIG. 6 counterclockwise. Since arm 26 is welded fast to rod 20, the rod 20 turns likewise in the counterclockwise direction. At the ends 20E of the rod 20, the force exerted clockwise by the torsion springs 24 is overcome by the pulling force of the cable 134 so that the levers 116 also rotate counterclockwise, moving the backing plate 114 and the bumper guard 110 in the same direction until the bumper guard 110 is fully retracted to the stowed position shown in FIG. 5C. This pulling force of the cable 134 in the second embodiment is the same force caused by the closing motion of the door D moving from the open position shown in FIG. 7B to the closed position shown in FIG. 7A.

The foregoing preferred embodiments are considered to be only illustrative of the operating principles of the present invention. Numerous other modifications and changes will readily occur to those persons skilled in the motor vehicle arts after a detailed study of this specification is undertaken. Consequently, the disclosed invention is not limited to the exact construction and operation shown and described hereinabove, but rather is intended to be covered both by the letter and by the spirit of the following claims.

What I claim as my invention is:

1. A retractable guard mechanism for a motor vehicle door having a front hinge, a rear edge, and a latch, said mechanism comprising:
   a. means for projecting from the front hinge of the door;
   b. first means for clamping to the projecting means;
   c. a cable attached at one end to the first clamping means;
   d. second means for clamping to an opposite end of the cable;

e. an arm attached at one end to the second clamping means;
f. a rod fixed to an opposite end of the arm;
g. lever means, mounted at one end to both ends of the rod, for turning with the rod as the rod is rotated about its longitudinal axis;
h. first spring means, coiled around both ends of the rod, for forcing the lever means to an extended position;
i. plate means, mounted as its rear side to an opposite end of the lever means, for pivoting around said opposite end of the lever means beyond the rear edge of the door;
j. an elastic bumper guard secured to a front side of the pivoting plate means; and
k. second spring means, attached to the rear side of the pivoting plate means, for rotating the pivoting plate means with the elastic bumper guard secured thereto to an extended position.

2. The retractable guard mechanism according to claim 1, further comprising housing means for the cable.

3. The retractable guard mechanism according to claim 2, further comprising:
bracket means, secured to the door near to the front hinge, for carrying the cable housing means towards the first clamping means while the door is being opened.

4. The retractable guard mechanism according to claim 2, further comprising:
bracket means, secured to the door near to the rear edge thereof, for holding the cable housing means in place while the door is being opened.

5. The retractable guard mechanism according to claim 1, further comprising:
bracket means, secured to the door near to the rear edge thereof, for securing the rod at both ends to the door.

6. The retractable guard mechanism according to claim 1, further comprising:
eyelet means, formed at the rear side of the pivoting plate means, for attaching the second spring means thereto.

7. The retractable guard mechanism according to claim 1, wherein both the pivoting plate means and the elastic bumper guard secured thereto have portions cutout to allow a neat fit around the latch of the door.

8. The retractable guard mechanism according to claim 1 wherein the second spring means includes at least one tension spring.

9. The retractable guard mechanism according to claim 8, further comprising:
bracket means, secured to the door near to the rear edge thereof, for holding thereto in place one end of the tension spring.

10. The retractable guard mechanism according to claim 8 wherein the opposite end of each lever means is rounded.

11. The retractable guard mechanism according to claim 1 wherein the second spring means includes at least one coil spring.

12. The retractable guard mechanism according to claim 11 wherein the opposite end of each lever means has a jutting corner means for preventing further rotation, caused by the coil spring, of the pivoting plate means with the elastic bumper guard secured thereto.

13. A retractable guard mechanism for a vehicle door having a front hinge and a rear edge, said mechanism comprising:
a. a bumper guard;
b. first means, secured near to the rear edge of the door, for pivoting the bumper guard to an extended position beyond the rear edge of the door;
c. second means, secured to the first pivoting means, for pivoting the bumper guard upon impact around said first pivoting means; and
d. cable means, secured between the front hinge and the rear edge of the door, for retracting the bumper guard from its extended position beyond the rear edge of the door.

14. The retractable guard mechanism according to claim 13, further comprising:
spring means, secured to the second pivoting means, for retracting the bumper guard after the impact is alleviated.

15. A retractable guard mechanism for a vehicle door having a front hinge and a rear edge, said mechanism comprising:
a. a cable being secured at one end to the front hinge and also being secured at an opposite end near to the rear edge of the door;
b. rod means being connected to the opposite end of the cable and being rotatable by said cable upon movement of the door;
c. lever means, mounted at one end to the rod means, for moving in a circular path as the rod means is rotated;
d. plate means, connected at its rear side to an opposite end of the lever means, for pivoting around said opposite end of the lever means beyond the rear edge of the door upon impact; and
e. an elastic bumper guard secured to a front side of the pivoting plate means.

16. The retractable guard mechanism according to claim 15, further comprising:
spring means, attached to the rear side of the pivoting plate means, for retracting the pivoting plate means with the elastic bumper guard.

* * * * *

UNITED STATES PATENT AND TRADEMARK OFFICE
CERTIFICATE OF CORRECTION

PATENT NO. : 4,839,991

DATED : June 20, 1989

INVENTOR(S) : Peter M. Rathgeb

It is certified that error appears in the above-identified patent and that said Letters Patent is hereby corrected as shown below:

Col. 3, line 34, after "and" insert --an--

Col. 5, line 16, after "when" insert --the--
       line 55, delete the comma

Col. 7, line 26, change "ence" to --ences--

Col. 9, claim 7, line 46, change "cutout" to --cut out--
       claim 8, line 48, after "1" insert a comma Col. 10, claim 10, line 2, after "8" insert a comma
        claim 11, line 5, after "1" insert a comma
        claim 12, line 8, after "11" insert a comma Signed and Sealed this Third Day of July, 1990

*Attest:*

HARRY F. MANBECK, JR.

*Attesting Officer*   Commissioner of Patents and Trademarks